No. 643,492. Patented Feb. 13, 1900.
P. FROMHOLZ.
EXTENSION HANDLE FOR CULINARY ARTICLES.
(Application filed June 10, 1899.)
(No Model.)

Inventor
Paul Fromholz
By R.H.A.B. Lacey
his Attorneys

Witnesses

UNITED STATES PATENT OFFICE.

PAUL FROMHOLZ, OF CALUMET, MICHIGAN.

EXTENSION-HANDLE FOR CULINARY ARTICLES.

SPECIFICATION forming part of Letters Patent No. 643,492, dated February 13, 1900.

Application filed June 10, 1899. Serial No. 720,063. (No model.)

*To all whom it may concern:*

Be it known that I, PAUL FROMHOLZ, a citizen of the United States, residing at Calumet, in the county of Houghton and State of Michigan, have invented certain new and useful Improvements in Extension-Handles for Culinary Articles; and I do hereby declare the following to be a full, clear, and exact description of the invention, such as will enable others skilled in the art to which it appertains to make and use the same.

This invention has relation to handles for frying-pans, skillets, and kindred culinary articles, the object being the provision of a device of the nature aforesaid which can be reduced in length, extended, or folded, as required, and which when folded will admit of the article occupying a small space. When applied to cooking utensils designed for camping outfits or outdoor use in connection with open fires, the advantages will be apparent, as it enables the handle to be folded, so as to be out of the way, or extended to obviate burning the hands and the inconvenience resulting from having to stand very close to the fire when manipulating the device.

For a full understanding of the merits, advantages, and details of construction of the invention reference is to be had to the following description and the drawings hereto attached.

It will be apparent in adapting the invention to any particular form of vessel or utensil that various changes in the form, proportions, and minor details of construction may be resorted to without departing from the spirit or sacrificing any of the advantages thereof.

Figure 1:
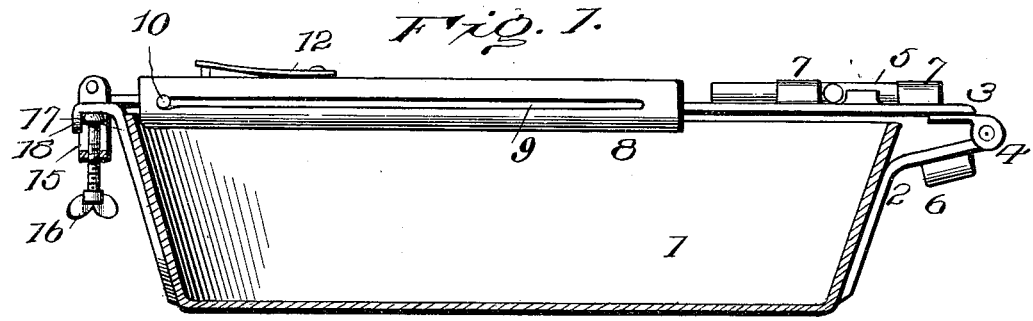
Figure 2:
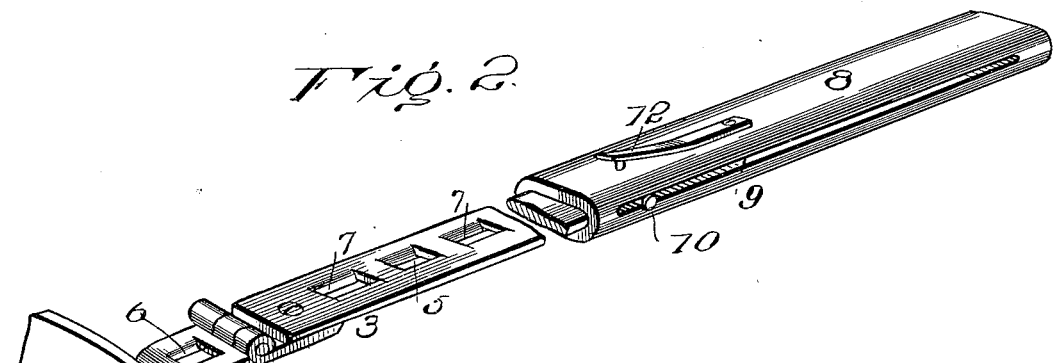
Figure 3:
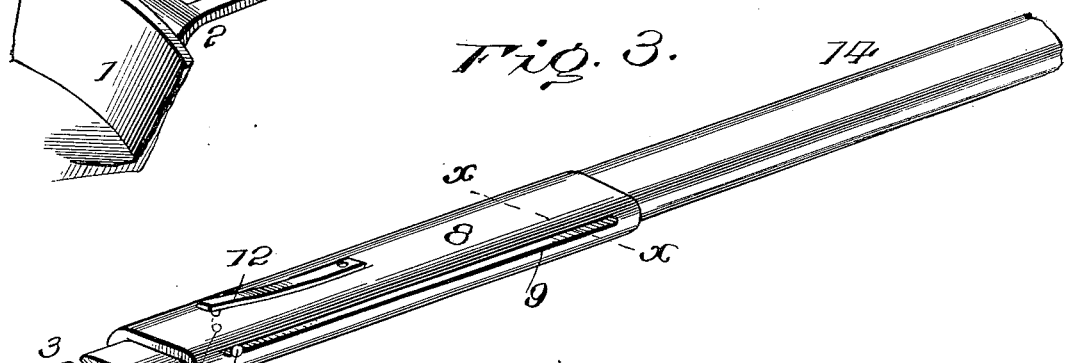
Figure 4:

Referring to the drawings forming a part of the specification, Figure 1 is a transverse section of a frying-pan, showing the application of the extensible and foldable handle, the latter being folded. Fig. 2 is a perspective view of the handle when unfolded. Fig. 3 is a detail view of the outer end portion of the handle, showing the extensible or slidable part slipped outward and a stick or supplemental extension fitted thereto. Fig. 4 is a cross-section about on the line X X of Fig. 3.

Corresponding and like parts are referred to in the following description and indicated in all the views of the drawings by the same reference characters.

As previously stated, the handle is designed to be applied to any of the various kinds of cooking utensils, and for the sake of illustration it is shown applied to a frying-pan, the latter being indicated by the reference-numeral 1. The handle proper is composed of an inner section 2 and an outer section 3, hingedly connected at 4 in any desired manner, so as to admit of the section 3 folding over the frying-pan or like utensil. The inner section 2 is secured directly to the utensil in any of the usual ways and is deflected or bent and riveted to the part 1.

When the section 3 is unfolded or turned into a position to aline with the section 2, it is necessary to stiffen and brace the hinge-joint in order to hold the sections in alinement and prevent movement of the outer section either upward or downward. Any suitable and effective means may be provided for this purpose, and, as shown, a bolt 5 is slidably mounted on the section 3 and is adapted to be engaged with a keeper 6, applied to or formed with the section 2. This bolt is adapted to be shot across the hinge-joint and engage with the keeper 6 after the section 3 has been turned outward, so as to aline with the section 2. The bolt 5 may be mounted upon the section 3 in any desired manner, and for the sake of simplicity of construction transverse slits are formed in the section 3 intermediate of its longitudinal edges, and portions, as 7, between the slits are pressed away from the plane of the section 3, forming keepers in which the bolt 5 is slidably mounted. The keeper 6 is formed in a similar manner to the keepers 7 and is integral with the section 2, being pressed outward therefrom. An extensible section 8 is slidably mounted upon the foldable section 3 and is of tubular form, its inner end being closed by a plate centrally apertured to receive the section 3 and its outer end being open. Longitudinal slots 9 are formed in the sides of the extensible or slidable section 8 in transverse alinement and receive projections 10, extending outward from the edges of the section 3. Lugs 11 are provided at the outer end of the foldable section 3, upon the top and bottom sides thereof, and engage with the upper and lower walls of the slidable section 8 and serve to centralize the latter and prevent relative vertical play thereof.

When it is required to lengthen the handle after the section 3 has been unfolded and secured, the slidable section 8 is slipped outward upon the outer portion of the handle. A spring-actuated catch 12 is applied to the inner end portion of the extensible section 8 and is adapted to enter openings 13, formed in the end portions of the foldable section 3, whereby the slidable section is held in either of its extreme positions. When the section 8 is moved outward to its extreme limit and it is desired to further increase the length of the handle, a stick or supplemental extension 14 is slipped into the open end of the part 8, as shown in Fig. 3.

When the handle is folded, as shown in Fig. 1, it is held fast at its free end by suitable interlocking means between it and the pan. For this purpose a bail 15 is loosely connected with the outer end of the foldable section 3 and a clamp-screw 16 is threaded into the closed end of the said bail. A catch 17 is applied to the side of the pan or utensil diametrically opposite the point of attachment therewith of the handle, and this catch consists of a plate secured by rivets or otherwise to the side of the pan and having its upper end bent outward and downward, forming a hook 18. When the handle is folded, the bail 15 is swung under the hook 18, and the clamp-screw 16 is screwed into the bail until its inner end engages with the lower side of the hook 18, the latter being clamped between the terminal portion of the foldable section and the extremity of the screw 16. When the parts are positioned as shown in Fig. 1, the handle is secured against accidental displacement and occupies a minimum amount of space, thereby admitting of the pan or utensil being conveniently stored when the space or room is of a limited character.

The invention is particularly adapted for use in connection with cooking utensils designed for camping outfits, as it enables the handle to be turned out of the way and to be extended to any required length to suit the convenience and comfort of the person attending the device when in service.

By having the section 8 tubular it is adapted to receive the section 3 and the attaching end of the extension 14 and is light compared with its size, which latter feature provides an extended surface to enable a firm, comfortable, and positive grip thereof in the hand. The opening in the inner closed end of the part 8 is of a size corresponding to a cross-section of the part 3, so as to prevent relative vertical and lateral movement of the parts 3 and 8 at a point corresponding with the inner end of the section 3. The lateral extensions 10 pass through the slots 9, and their projecting ends are upset and serve to prevent relative play of the inner end of the section 3 when sliding the section 8 either in or out. In this respect the parts 9 and 10 supplement the action of the parts 11 and render it possible to dispense with the said parts 11, although the construction shown is preferred. The provision of the slots 9 and the extensions 10 and the opening in the closed end of the section 8 results in a rigid and stiff handle and obviates wabbling of the part 8.

Having thus described the invention, what is claimed as new is—

1. In an extensible handle for culinary articles, relatively-slidable sections, one of the sections being tubular and having longitudinal slots in its opposite sides and having an end closed, and the other section slidable through an opening in the said closed end and having lateral extensions to operate in the said longitudinal slots, substantially as described.

2. In a handle of the character described, a fixed section having upper and lower projections at its outer end, and a tubular section slidable upon the fixed section and having its inner end provided with a plate apertured to receive the fixed section and having its outer end open and its upper and lower walls in engagement with the said extensions, substantially as set forth.

3. The combination with a frying-pan or the like, a catch applied to one side of the pan, a foldable handle secured at one end to the diametrically opposite side of the pan, a catch member pivoted to the free end of the handle and adapted to be turned down and interlock with the catch of the pan, and a tubular section slidable upon the handle and adapted when extended to house the pivoted catch member, substantially as set forth.

In testimony whereof I affix my signature in presence of two witnesses.

PAUL FROMHOLZ. [L. S.]

Witnesses:
CEIL FROMHOLZ,
CHARLES KRATT.